(12) United States Patent  
Ogura

(10) Patent No.: US 6,654,160 B2
(45) Date of Patent: Nov. 25, 2003

(54) LASER SCANNING OPTICS AND LASER SCANNING METHOD USING THE SAME

(75) Inventor: Yukio Ogura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/076,764

(22) Filed: Feb. 14, 2002

(65) Prior Publication Data

US 2002/0114081 A1 Aug. 22, 2002

(51) Int. Cl.$^7$ .............................................. G02B 26/08
(52) U.S. Cl. ..................................... 359/298; 359/201
(58) Field of Search .............................. 359/298, 299, 359/206, 662, 201, 202, 305; 347/256, 258, 259, 260; 250/234

(56) References Cited

U.S. PATENT DOCUMENTS 4,591,880 A * 5/1986 Mitsuka ........................ 347/250
5,142,404 A * 8/1992 Shiraishi et al. ............. 359/217
5,868,075 A * 2/1999 Kline et al. .................. 101/467

FOREIGN PATENT DOCUMENTS

| JP | 58-137738 | 8/1983 |
| JP | 63-25550 | 5/1988 |
| JP | 2783328 | 5/1998 |
| JP | 2984635 | 9/1999 |
| JP | 2000-66161 | 3/2000 |

\* cited by examiner

Primary Examiner—Scott J. Sugarman
Assistant Examiner—Richard Hanig
(74) Attorney, Agent, or Firm—Ostrolenk, Faber, Gerb & Soffen, LLP

(57) ABSTRACT

Laser scanning optics for scanning a laser beam issuing from a laser in the main scanning direction while repeatedly steering it in the subscanning direction is disclosed. The laser scanning optics includes focusing optics for focusing the laser beam, a first deflector for steering the laser beam in the subscanning direction, and a second deflector for steering the laser beam in the main scanning direction. The focusing optics causes the laser beam to form an elliptical beam spot, which is elongate in the main scanning direction, in a scanning plane. The first deflector is driven such that the laser beam is scanned at a higher speed in the subscanning direction than in the main scanning direction. The first deflector is so controlled, based on a value input beforehand or data measured beforehand, as to correct the distortion of linearity in the main scanning direction by subscanning.

30 Claims, 4 Drawing Sheets

LASER SCANNING OPTICS AND LASER SCANNING METHOD USING THE SAME

BACKGROUND OF THE INVENTION

1. Field of the Invention

The present invention relates to laser scanning optics for scanning a laser beam and a laser scanning method using the same. More particularly, the present invention relates to laser scanning optics feasible for, e.g., a thermal transfer system that thermally transfers the pattern of a color filter or an EL (electroluminescence) material to a substrate, and a laser scanning method using the same.

2. Description of the Background Art

Laser scanning optics has customarily been applied to a thermal transfer system mentioned above and a laser printer or similar electrophotographic image forming apparatus for forming a latent image on a photoconductive element. Laser scanning optics for this kind of application is used to form text and graphic images, which are recognizable by eye, and therefor not sufficient for a transfer system of the type needing highly accurate resolution and linearity. Transfer systems of this type include a system for transferring the color filter of a liquid crystal display panel and a display system using EL devices. While optics included in such systems is configured to correct errors in the configuration of a deflector, it cannot reduce the influence of, e.g., a stage.

The conventional laser scanning optics described above scans a laser beam in only one direction. Therefore, the linearity of a line drawn by scanning depends on the accuracy of a deflector and that of optics. This brings about a problem that the bending and waving of a scanning line cannot be corrected.

Moreover, because the laser beam is steered in only one direction, the light intensity distribution of the laser beam is not flat in the direction (subscanning direction) perpendicular to the scanning direction (main scanning direction). More specifically, the light intensity distribution is a Gaussian distribution or a distribution close to it dependent on the intensity distribution of the beam. Consequently, in a laser scanning type of thermal transfer system, the non-uniform light intensity distribution in the subscanning direction directly translates into a non-uniform thermal energy distribution, resulting in irregular transfer.

Technologies relating to the present invention are disclosed in, e.g., Japanese Patent Laid-Open Publication No. 58-137738, Japanese Patent Publication No. 63-25550, Japanese Patent Laid-Open Publication No. 2000-66161, and Japanese Patent Nos. 2,783,328 and 2,984,635.

SUMMARY OF THE INVENTION

It is an object of the present invention to provide laser scanning optics capable of correcting the bending and waving or a scanning line to thereby insure accurate linearity in the main scanning direction, and providing the light intensity distribution of a laser beam with a flat top to thereby obviate irregular transfer, and a laser scanning method using the same.

In accordance with the present invention, laser scanning optics for scanning a laser beam issuing from a laser in the main scanning direction while repeatedly steering it in the subscanning direction includes focusing optics for focusing the laser beam, a first deflector for steering the laser beam in the subscanning direction, and a second deflector for steering the laser beam in the main scanning direction. The focusing optics causes the laser beam to form an elliptical beam spot, which is elongate in the main scanning direction, in a scanning plane. The first deflector is driven such that the laser beam is scanned at a higher speed in the subscanning direction than in the main scanning direction. The first deflector is so control led, based on a value input beforehand or data measured beforehand, as to correct the distortion of linearity in the main scanning direction by subscanning.

A laser scanning method using the above laser scanning optics is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
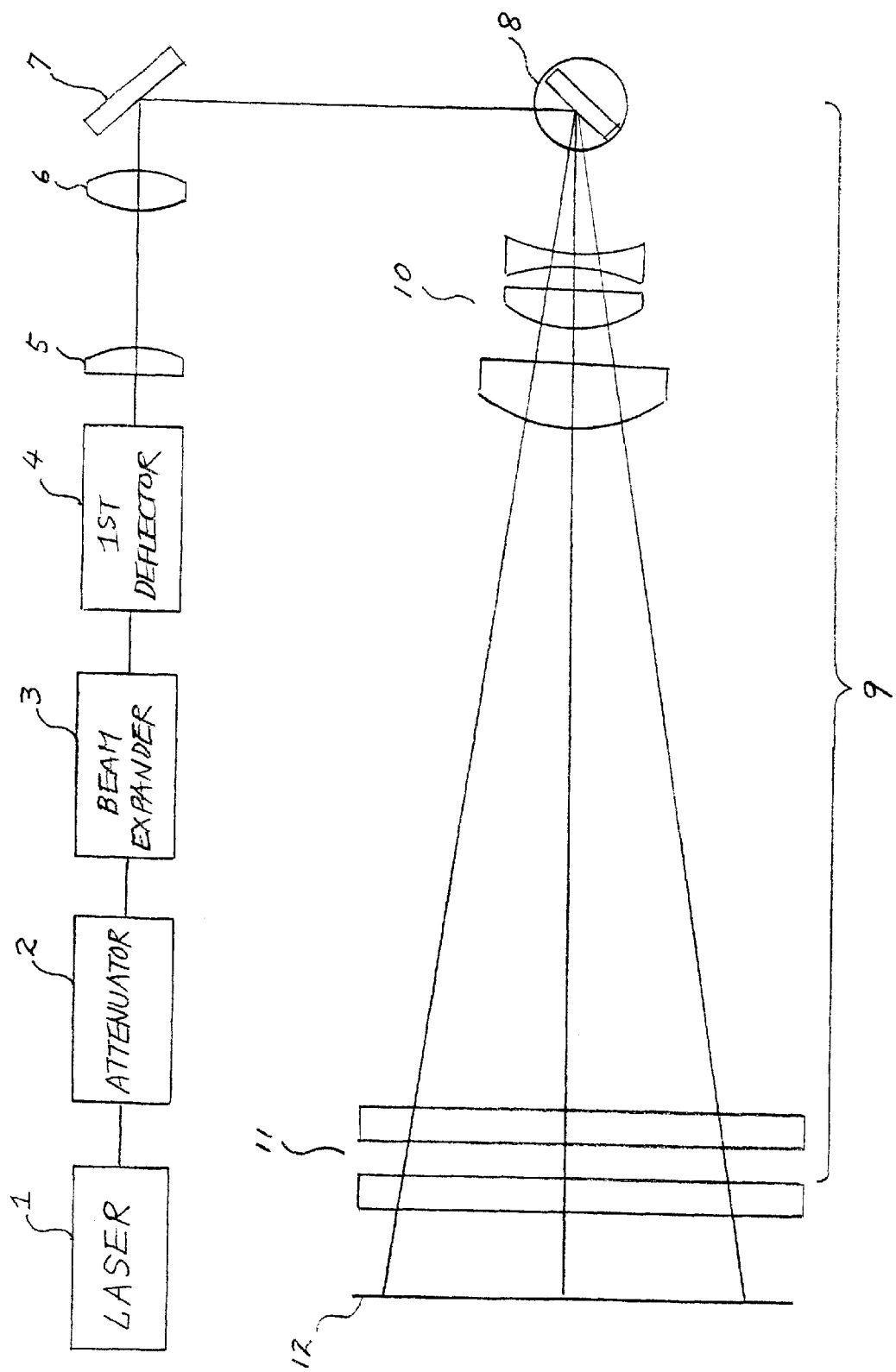
FIG. 1 is a view showing laser scanning optics embodying the present invention.

Referring to FIG. 1 of the drawings, laser scanning optics embodying the present invention is shown and includes a laser or light source 1. A laser beam issuing from the laser 1 is incident to an attenuator 2. The attenuator 2 attenuates the laser beam to optical energy necessary for processing. A beam expander 3 expands the attenuated laser beam output from the attenuator 2 to provide it with a required beam diameter. A first deflector 4 steers the laser beam having the required beam diameter in the direction (subscanning direction y hereinafter) perpendicular to the sheet surface of FIG. 1. The laser beam being steered in the subscanning direction y is incident to a second deflector 8 via a cylindrical lens 5, a collimator lens 6, and a mirror 7.

The second deflector 8 steers the incident laser beam in the direction x (main scanning direction x hereinafter; up-and-down direction in FIG. 1). The laser beam being steered in the main scanning direction x scans a scanning plane 12 with a preselected beam configuration via focusing optics 9. A 45° mirror, not shown, intervenes between the second deflector 8 and the scanning plane 12. In the illustrative embodiment, a substrate, not shown, is positioned in the scanning plane 12 in a horizontal position. While the focusing optics 9 is shown as including an f/θ lens 10 and a cylindrical lens 11, such a configuration is only illustrative.

Figure 2:
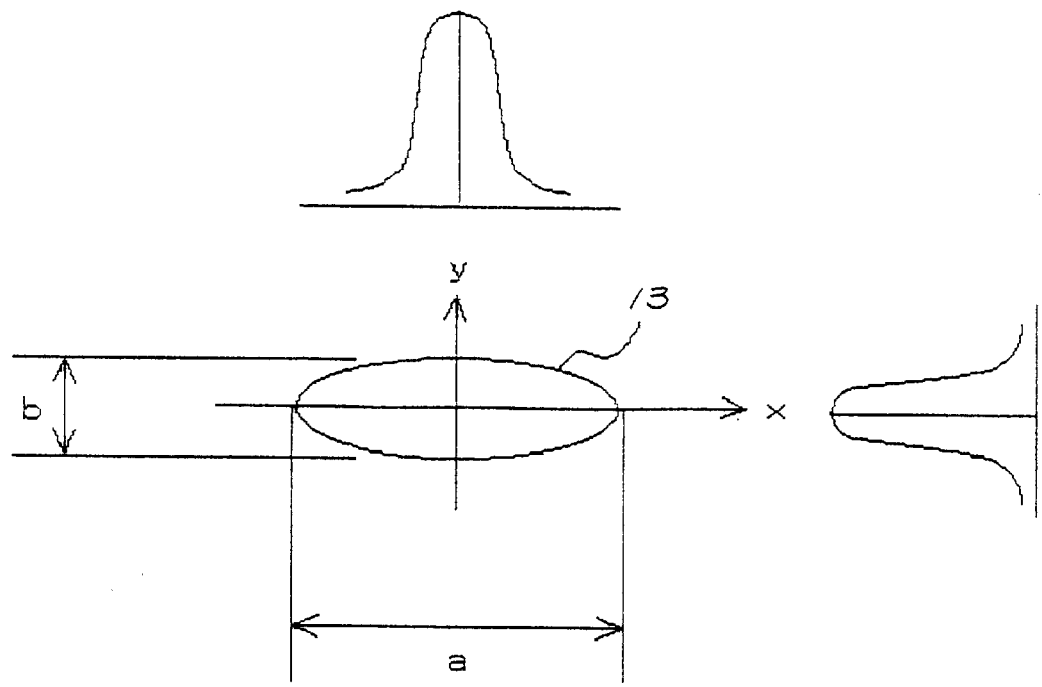
FIG. 2 shows the configuration and light intensity distribution of a beam spot achievable with the illustrative embodiment in a scanning plane.

FIG. 2 illustrates the configuration and light intensity distribution of a beam spot 13 in the scanning plane 12, FIG. 1. As shown, the beam spot 13 is elliptic and has a longer axis in the main scanning direction x and a shorter axis in the subscanning direction y. The longer axis has a dimension a determined mainly by the f/θ lens 10 while the shorter axis has a dimension b determined mainly by the f/θ lens 10 and cylindrical lens 11. The dimension a may be about ten times as great as the dimension b by way of example.

Figure 3:
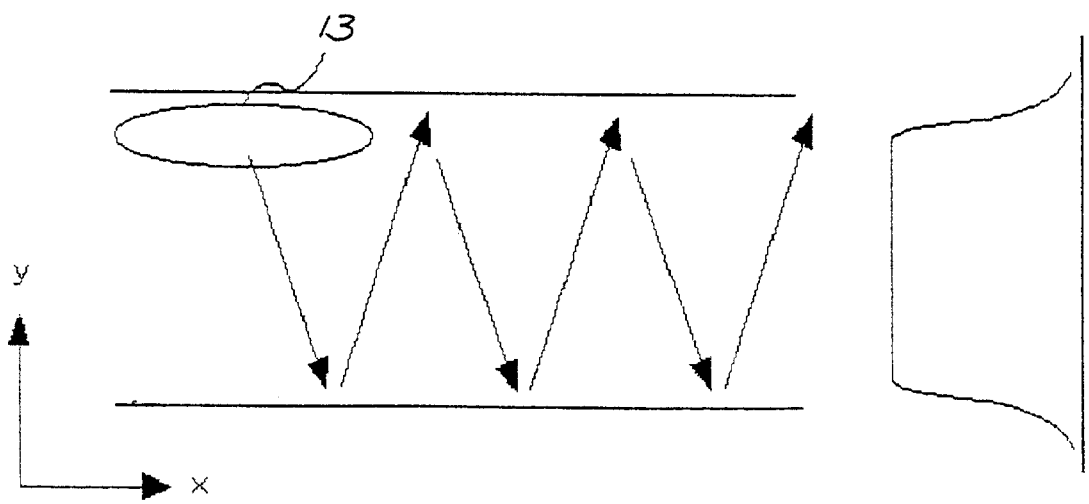
FIG. 3 shows how the illustrative embodiment steers a laser beam in a processing plane together with the light intensity distribution of the laser beam.

FIG. 3 demonstrates how the beam spot 13, FIG. 2, scans the scanning plane 12. As shown, the beam spot 13 repeatedly scans the scanning plane 12 at high speed in the subscanning direction y. At the same time, the beam spot 13 is steered in the main scanning direction x.

The operation of the illustrative embodiment will be described more specifically with reference to FIGS. 1 through 3 hereinafter. The laser beam issuing from the laser 1 is circular and has a diameter of about 1 mm by way of example. Assume that the illustrative embodiment is applied to a liquid crystal color filter transferring system. Then, the laser beam transfers a film-like pigment material to a glass substrate positioned in the scanning plane 12. In this case, it is necessary to control the optical energy of the laser beam in accordance with the material to be transferred, the output deterioration of the laser 1 and so forth. To guarantee optical energy necessary for transfer, the laser 1 is implemented by, but not limited to, a Nd/YAG (neodymium yag laser) having an oscillation wavelength of 1,064 nm.

The attenuator 2 varies the transmittance and therefore the optical energy of the laser beam and is control led such that optical energy lying in a preselected range is always incident. The focal distance of the focusing optics 9 and the diameter of the laser beam incident thereto determine the beam spot size in the scanning plane 12. The beam expander 3 expands or compresses the laser beam output from the attenuator 2. The beam expander 3 cooperates with the cylindrical lens 5 and collimator lens 6, which will be described later specifically, to control the beam spot to a preselected size in the scanning plane 12.

The first deflector 4 steers the laser beam in the subscanning direction y in FIG. 3. In the focusing optics 9, the f/θ lens 11 focuses the laser beam in both of the main scanning direction x and subscanning direction y while the cylindrical lens 11 focuses it only in the subscanning direction y. As a result, the laser beam forms an elliptical beam spot having a substantially Gaussian intensity distribution in both of the directions x and y, as shown in FIG. 2.

As shown in FIG. 3, the laser beam with the configuration shown in FIG. 2 scans the scanning plane 12 at high speed in the subscanning direction y while being steered in the main scanning direction x. As a result, an optical energy distribution having a flat top in the subscanning direction y is set up. It is to be noted that the first deflector 4 can vary the drawing beam width in the subscanning direction y if the scanning angle in the direction y is varied. The first deflector 4 can therefore vary its scanning angle in matching relation to a desired pattern size. While FIG. 3 shows that the laser beam scans the scanning plane 12 back and forth in the direction y in a zigzag pattern, it may repeatedly scan it in only one direction, if desired.

The second deflector 8 steers the laser beam in the main scanning direction x, as stated earlier. The problem with the second deflector 8 is that it involves an angle error in the subscanning direction y and therefore fails to steer the laser beam linearly in the main scanning direction x. As a result, the laser beam slightly waves in the subscanning direction y while scanning the scanning plane 12. More specifically, in the case of a color filter transferring system, the laser beam scans a substrate obliquely in the main scanning direction x. It is therefore necessary to correct the laser beam with a preselected value in the subscanning direction y. The second deflector 8 serves to correct the laser beam in such a manner at the same time.

The first and second deflectors 4 and 8 are respectively implemented by, but not limited to, an AOD (Acousto-Optical Deflector) that can be driven at high speed and a galvanometer mirror having a wide scanning angle. Alternatively, the deflectors 4 and 8 may be implemented by an electrooptic deflector and a galvanometer mirror, respectively. Further, as for the deflector 8, use may be made of a polygonal mirror.

When the second deflector 8 steers the laser beam over a wide angle, the incidence angle to the lens or the 45° mirror and therefore the transmittance or the reflectance differs from around the optical axis to the peripheral portion. However, the AOD constituting the first deflector 4 can modulate the intensity of the laser beam by amplitude modulation at preselected frequency and can modulate the angle of the laser beam by modulating radio frequency. The AOD therefore allows amplitude modulation to be effected with frequency in matching relation to the scanning angle such that optical energy remains constant in the scanning plane 12. For this kind of control, use may be made of data calculated or measured beforehand or a sensor, not shown, positioned in the main scanning direction for monitoring light intensity.

Distorted linearity and non-uniform light intensity distribution in the main scanning direction x occur, in many cases, periodically as the laser beam repeatedly scans the scanning plane 12 in the direction x. The first deflector 4 can correct such errors if the errors are measured to determine correction values beforehand.

As stated above, the illustrative embodiment causes the laser beam to form an elliptical beam spot whose longer axis is coincident with the main scanning direction x. The laser beam scans the scanning plane 12 at high speed in the subscanning direction y to thereby set up an optical energy distribution having a fiat top in the direction y. Further, the first deflector 4 corrects bending or waving in the main scanning direction x for thereby enhancing linearity in the main direction x.

Figure 4A:
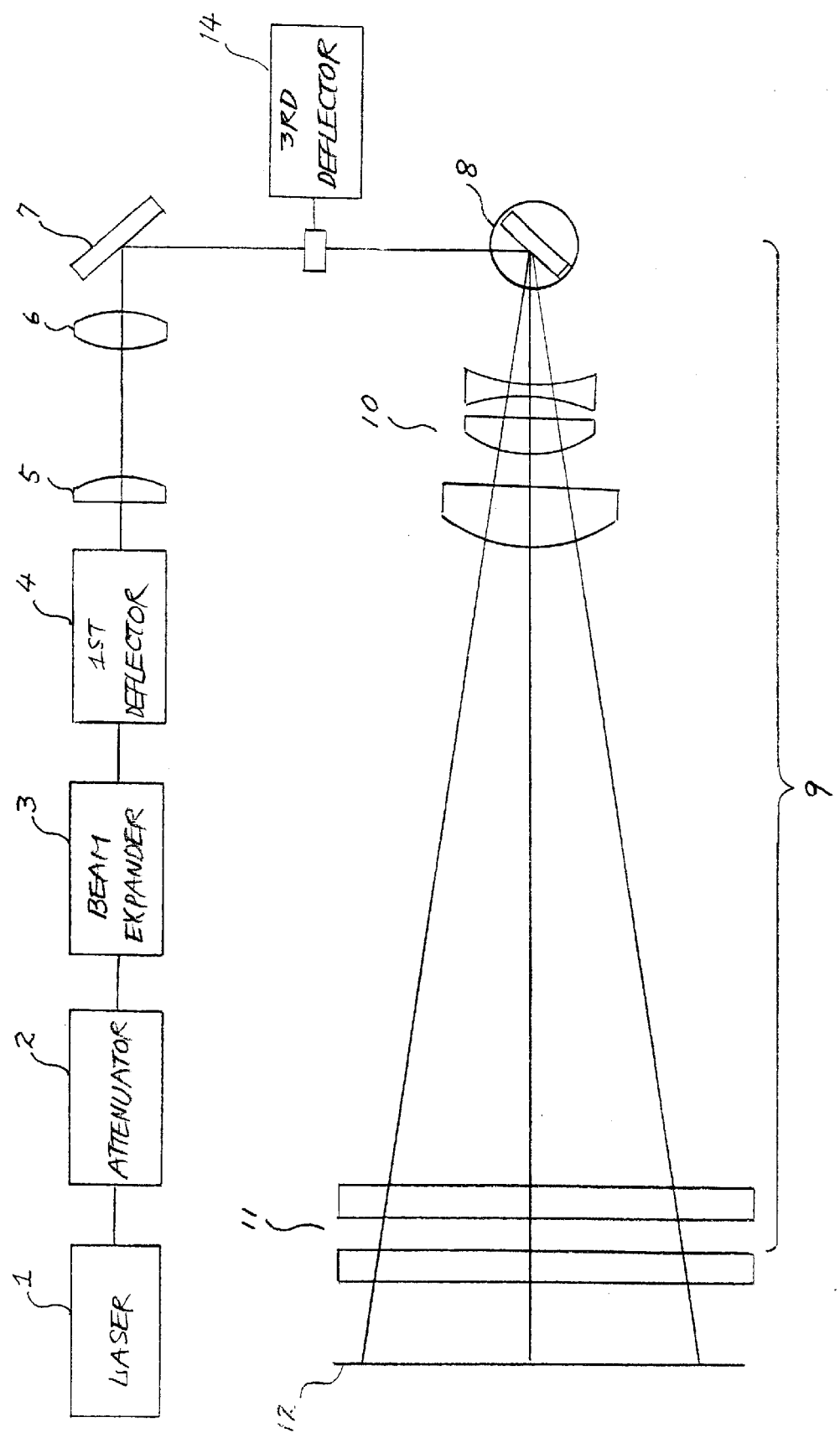
FIGS. 4A and 4B are views showing an alternative embodiment of the present invention.
Figure 4B:
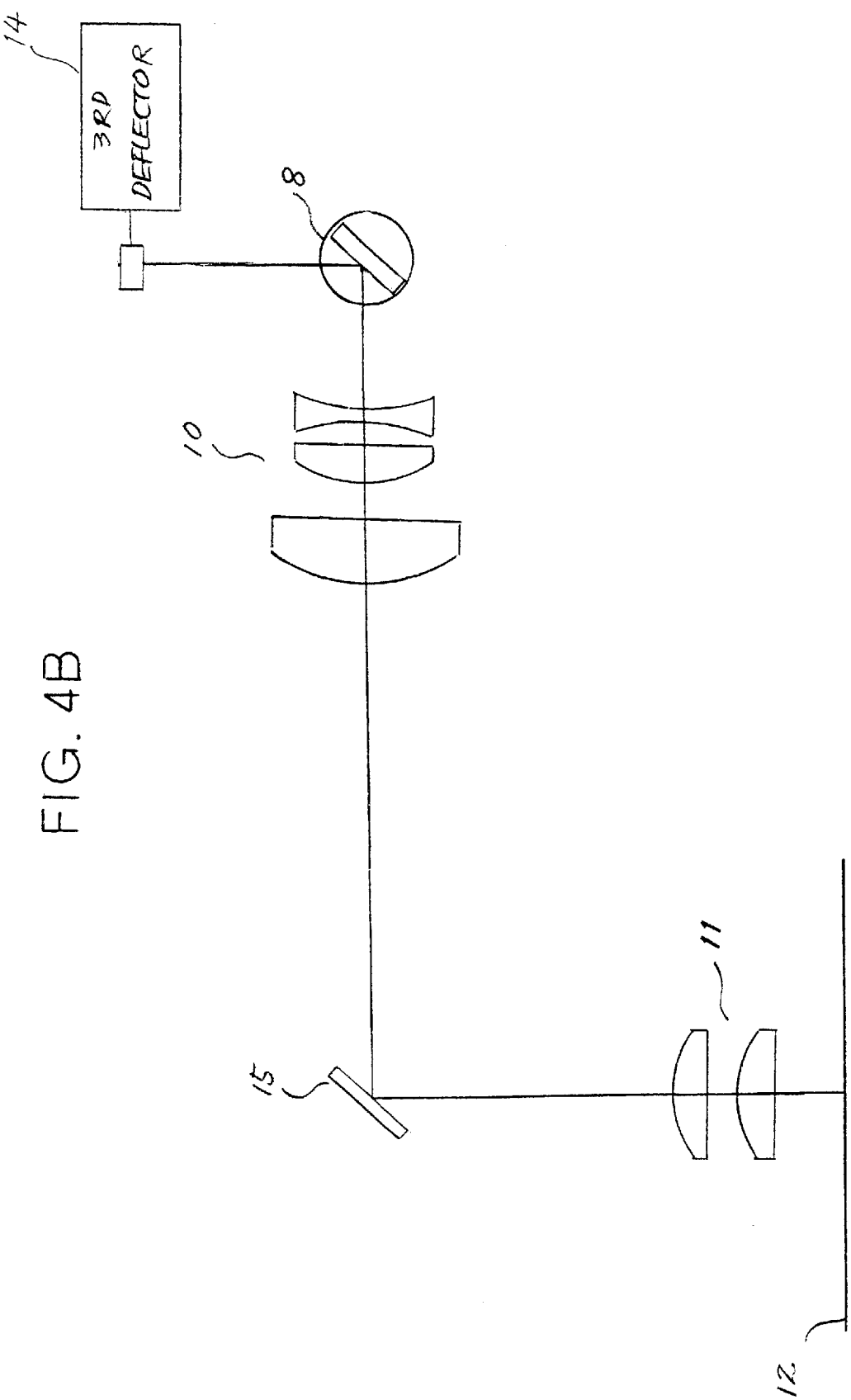

Reference will be made to FIGS. 4A and 4B for describing an alternative embodiment of the present invention. This embodiment differs from the previous embodiment in that it additionally includes a third deflector 14 between the first deflector 4 and the second deflector 8. Structural elements identical with the structural elements of the previous embodiment are designated by identical reference numerals and will not be described specifically in order to avoid redundancy. As shown, the laser beam issuing from the laser 1 is attenuated by the attenuator 2 to required optical energy and then provided with a required beam diameter by the beam expander 3. The first deflector 4 steers the laser beam output from the beam expander 3 in the subscanning direction y. The laser beam is then incident to the third deflector 14 via the cylindrical lens 5, collimator lens 6, and mirror 7.

Assume that a stage loaded with a substrate is moved in the subscanning direction y while the laser beam is scanned in the main scanning direction x. Then, the laser beam scans the substrate in the oblique direction. Further, as shown in FIG. 3, when the laser beam scans the substrate in the main scanning direction x while being scanned in the subscanning direction y by the first deflector 4, the deflector 4 sometimes fails to fully correct edge linearity alone. In the illustrative embodiment, the third deflector 14 located at the position shown in FIGS. 4A and 4B insures edge linearity in the main scanning direction x with high accuracy.

The laser beam output from the third deflector 14 is incident to the second deflector 8 and steered in the main scanning direction x thereby. The laser beam steered then scans the scanning plane 12 after being shaped by the focusing optics 9. As shown in FIG. 4B, the focusing optics 9 may additionally include a 45° mirror 15 for reflecting the laser beam output from the second deflector 8. In any case, the third deflector 14 intervening between the first deflector 4 and the second deflector 8 accurately corrects bending or waving in the main scanning direction left uncorrected by the first deflector 4. The illustrative embodiment therefore enhances linearity in the main scanning direction x more than the previous embodiment.

In summary, in accordance with the present invention, laser scanning optics scans a laser beam in the main scanning direction while steering it in the subscanning direction. A first deflector corrects the positional error and non-uniform optical energy distribution of the laser beam. Further, a third deflector following the first deflector corrects the positional error with high accuracy. The laser scanning optics therefore provides a thermal transfer system for producing color filters by thermal transfer or thermally transferring an organic EL (electroluminescence) material to substrates with desirable linearly, a uniform optical energy distribution with a flat top, and high accuracy.

Various modifications will become possible for those skilled in the art after receiving the teachings of the present disclosure without departing from the scope thereof.

What is claimed is:

1. Laser scanning optics for scanning a laser beam issuing from a laser in a main scanning direction while repeatedly steering said laser beam in a subscanning direction, said scanning laser optics comprising:

focusing optics for focusing the laser beam;

a first deflector for steering the laser beam in the sub-scanning direction; and a second deflector for steering the laser beam in the main scanning direction;

wherein said focusing optics causes the laser beam to form an elliptical beam spot, which is elongate in the main scanning direction, in a scanning plane, said first deflector is driven such that the laser beam is scanned at a higher speed in the subscanning direction than in the main scanning direction, and said first deflector is so control led, based on a value input beforehand or data measured beforehand, as to correct a distortion of linearity in the main scanning direction by subscanning.

2. The optics as claimed in claim 1, wherein said focusing optics comprises an f/θ lens, a cylindrical lens and a beam expander and provides the laser beam with an elliptical shape having a preselected size and preselected flatness.

3. The optics as claimed in claim 1, wherein said first deflector comprises means for adjusting a scanning angle in the subscanning direction to thereby adjust a drawing beam width.

4. The optics as claimed in claim 3, wherein said first deflector comprises one of an AOD (Acousto-Optical Deflector), an electrooptical device, and a galvanometer mirror.

5. The optics as claimed in claim 4, wherein amplitude modulation and frequency modulation of said AOD are controlled in accordance with a scanning angle of said second deflector such that optical energy of the laser beam remains constant in the scanning plane.

6. The optics as claimed in claim 5, wherein said second deflector comprises either one of a galvanometer mirror and a polygonal mirror.

7. The optics as claimed in claim 6, wherein said focusing optics comprises an f/θ lens, a cylindrical lens and a beam expander and provides the laser beam with an elliptical shape having a preselected size and preselected flatness.

8. Laser scanning optics for scanning a laser beam issuing from a laser in a main scanning direction while repeatedly scanning said laser beam in a subscanning direction, said scanning laser optics comprising:

focusing optics for focusing the laser beam;

a first deflector for steering the laser beam in the sub-scanning direction; and a second deflector for steering the laser beam in the main scanning direction;

wherein said focusing optics causes the laser beam to form an elliptical beam spot, which is elongate in the main scanning direction, in a scanning plane, said first deflector is driven such that the laser beam is scanned at a higher speed in the subscanning direction than in the main scanning direction, and said first deflector is so control led, based on a value input beforehand or data measured beforehand, as to correct an optical energy distribution of the laser beam in the main scanning direction by subscanning.

9. The optics as claimed in claim 8, wherein said focusing optics comprises an f/θ lens, a cylindrical lens and a beam expander and provides the laser beam with an elliptical shape having a preselected size and preselected flatness.

10. The optics as claimed in claim 8, wherein said first deflector comprises means for adjusting a scanning angle in the subscanning direction to thereby adjust a drawing beam width.

11. The optics as claimed in claim 10, wherein said first deflector comprises one of an AOD (Acousto-Optical Deflector), an electrooptical device, and a galvanometer mirror.

12. The optics as claimed in claim 11, wherein amplitude modulation and frequency modulation of said AOD are controlled in accordance with a scanning angle of said second deflector such that optical energy of the laser beam remains constant in the scanning plane.

13. The optics as claimed in claim 12, wherein said second deflector comprises either one of a galvanometer mirror and a polygonal mirror.

14. The optics as claimed in claim 13, wherein said focusing optics comprises an f/θ lens, a cylindrical lens and a beam expander and provides the laser beam with an elliptical shape having a preselected size and preselected flatness.

15. Laser scanning optics for scanning a laser beam issuing from a laser in a main scanning direction while repeatedly scanning said laser beam in a subscanning direction, said scanning laser optics comprising:

focusing optics for focusing the laser beam;

a first deflector for steering the laser beam in the sub-scanning direction;

a second deflector for steering the laser beam in the main scanning direction; and a third deflector for steering the laser beam in the sub-scanning direction;

wherein said focusing optics causes the laser beam to form an elliptical beam spot, which is elongate in the main scanning direction, in a scanning plane, said first deflector is driven such that the laser beam is scanned at a higher speed in the subscanning direction than in the main scanning direction, and said first deflector and said third deflector are controlled, based on values input beforehand or data measured beforehand, such that said third deflector corrects a distortion of linearity in the main scanning direction by subscanning while said third deflector corrects an optical energy distribution in the main scanning direction by subscanning.

16. The optics as claimed in claim 15, wherein said focusing optics comprises an f/θ lens, a cylindrical lens and a beam expander and provides the laser beam with an elliptical shape having a preselected size and preselected flatness.

17. The optics as claimed in claim 15, wherein said first deflector comprises means for adjusting a scanning angle in the subscanning direction to thereby adjust a drawing beam width.

18. The optics as claimed in claim 17, wherein said first deflector comprises one of an AOD, an electrooptical device, and a galvanometer mirror.

19. The optics as claimed in claim 18, wherein amplitude modulation and frequency modulation of said AOD are controlled in accordance with a scanning angle of said second deflector such that optical energy of the laser beam remains constant in the scanning plane.

20. The optics as claimed in claim 19, wherein said second deflector comprises either one of a galvanometer mirror and a polygonal mirror.

21. The optics as claimed in claim 20, wherein said focusing optics comprises an f/θ lens, a cylindrical lens and a beam expander and provides the laser beam with an elliptical shape having a preselected size and preselected flatness.

22. A laser scanning method using laser scanning optics comprising at least a laser for emitting a laser beam, a first deflector for steering said laser beam in a subscanning direction and a second deflector for steering said laser beam in a main scanning direction to thereby scan said laser beam in the main scanning direction while repeatedly steering said laser beam in the subscanning direction, said laser scanning method comprising the steps of:

causing the laser beam to form an elliptical beam spot, which is elongate in the main scanning direction, in a scanning plane with said focusing optics;

driving said first deflector such that the laser beam is scanned at a higher speed in the subscanning direction than in the main scanning direction; and controlling, based on a value input beforehand or data measured beforehand, said first deflector for correcting a distortion of linearity in the main scanning direction by subscanning of said first deflector.

23. The method as claimed in claim 22, wherein said first deflector comprises one of an AOD.

24. The method as claimed in claim 23, further comprising controlling amplitude modulation and frequency modulation of said AOD in accordance with a scanning angle of said second deflector such that optical energy of the laser beam remains constant in the scanning plane.

25. A laser scanning method using laser scanning optics comprising at least a laser for emitting a laser beam, a first deflector for steering said laser beam in a subscanning direction and a second deflector for steering said laser beam in a main scanning direction to thereby scan said laser beam in the main scanning direction while repeatedly steering said laser beam in the subscanning direction, said laser scanning method comprising the steps of:

causing the laser beam to form an elliptical beam spot, which is elongate in the main scanning direction, in a scanning plane with said focusing optics;

driving said first deflector such that the laser beam is steered at a higher speed in the subscanning direction than in the main scanning direction; and controlling, based on a value input beforehand or data measured beforehand, said first deflector for correcting an optical energy distribution of the laser beam in the main scanning direction by subscanning of said first deflector.

26. The method as claimed in claim 25, wherein said first deflector comprises one of an AOD.

27. The method as claimed in claim 26, further comprising controlling amplitude modulation and frequency modulation of said AOD in accordance with a scanning angle of said second deflector such that optical energy of the laser beam remains constant in the scanning plane.

28. A laser scanning method using scanning laser optics comprising at least a laser for emitting a laser beam, a first deflector for steering said laser beam in a subscanning direction, a second deflector for steering said laser beam in a main scanning direction and a third deflector for steering said laser beam in the subscanning direction to thereby scan said laser beam in the main scanning direction while repeatedly steering said laser beam in the subscanning direction said laser scanning method comprising the steps of:

causing the laser beam to form an elliptical beam spot, which is elongate in the main scanning direction, in a scanning plane with said focusing optics;

driving said first deflector such that the laser beam is steered at a higher speed in the subscanning direction than in the main scanning direction; and controlling, based on values input beforehand or data measured beforehand, said first deflector and said third deflector such that said third deflector corrects a distortion of linearity in the main scanning direction by subscanning while said third deflector corrects an optical energy distribution in the main scanning direction by subscanning.

29. The method as claimed in claim 28, wherein said first deflector comprises one of an AOD.

30. The method as claimed in claim 29, further comprising controlling amplitude modulation and frequency modulation of said AOD in accordance with a scanning angle of said second deflector such that optical energy of the laser beam remains constant in the scanning plane.

* * * * *